Feb. 21, 1928.

A. W. SCHOEB 1,659,838

ADJUSTABLE UNIVERSAL WRENCH FOR AUTOMOBILES, TRACTORS, AND THE LIKE

Filed Dec. 1, 1925

Albert W. Schoeb INVENTOR.

BY Loyal J. Miller

ATTORNEY.

Patented Feb. 21, 1928.

1,659,838

UNITED STATES PATENT OFFICE.

ALBERT W. SCHOEB, OF RINGWOOD, OKLAHOMA.

ADJUSTABLE UNIVERSAL WRENCH FOR AUTOMOBILES, TRACTORS, AND THE LIKE.

Application filed December 1, 1925. Serial No. 72,430.

By invention pertains to improvements in adjustable universal wrenches for automobiles, tractors, and the like.

The object of my invention is to produce a wrench of the character described which will be new, novel, and of utility, and be cheap, durable and efficient; easily and quickly fitted and adjusted to any kind of a nut; easily and quickly adjusted to be worked in any kind of a position, particularly in cramped and inaccessible positions and where space is limited.

Other objects and advantages of the invention will be more particularly set forth and shown in the ensuing description and accompanying one-page drawing; of which, Figure 1 is an elevational view of the device showing in the dotted portion the position of the handle and crank rod when placed in a stationary position.

Like characters of reference designate like parts in all the figures.

Figure 1:
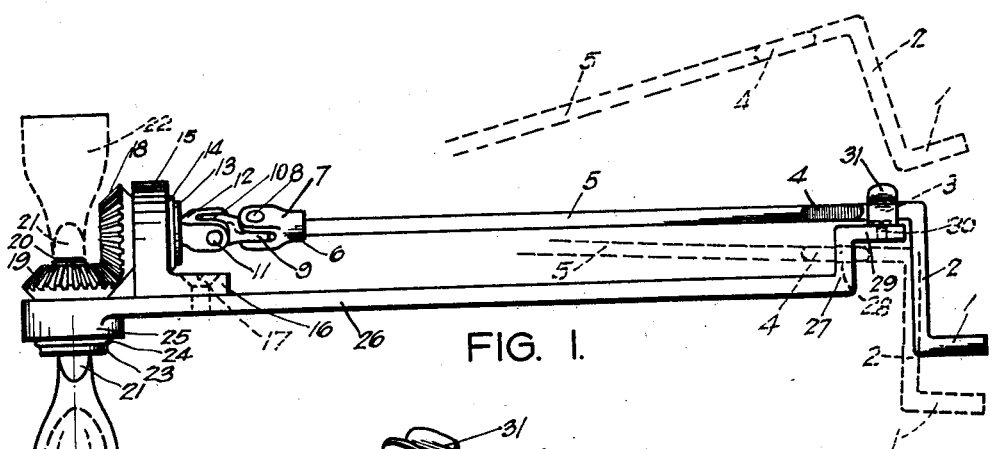
Figure 2:
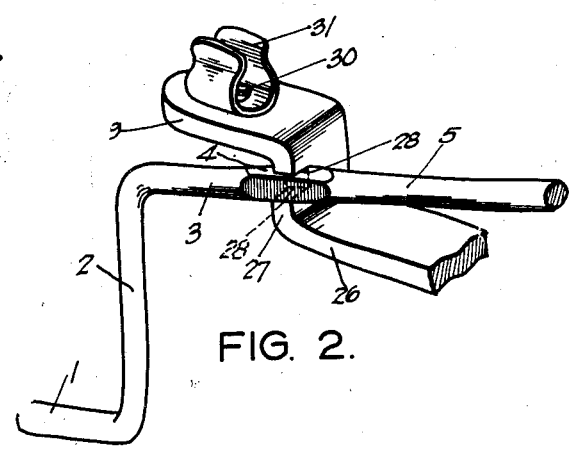
Figure 2 is a perspective view of a fragmentary portion of the device showing more plainly the position of the handle crank and crank rod when placed in a stationary position.
Figure 5:
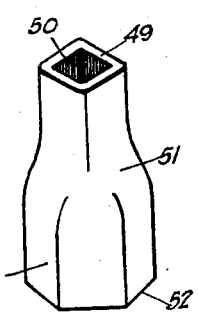
Figure 5 is a perspective view of a standard socket.
Figure 4:
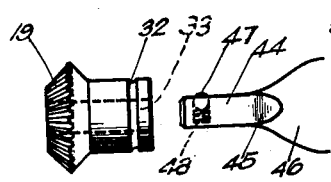
Figure 4 is an elevation view of one of the bevel gear members and showing another key means of connecting the nut holding member therein, and to the universal joint, and sockets.

In the accompanying drawing in which is illustrated the preferred embodiment of the invention, 1 designates the handles, 2 the crank, and 5 the shank connecting the handle and crank to the other working parts; 3 designates a round portion near the outer end of the shank 5 taking a bearing and revolving in clasp 31 on the outer end 29 of arm 26 held thereto by screw 30; a portion 4 of said shank 5 is squared and is adapted to be inserted in and held in place in groove 28 in the upright portion 27 of the rigid arm 26. Said shank 5 is rigidly connected at one end 6 to the first bifurcated section 7, 8, of the universal joint. The other portions of the universal joint 9, 10, 11, 12, are connected to said first section 7, and to a bevel gear 18 by a short shank 13, said shank being held in place by a compression ring 14 fitting in a groove as is shown at 32. Said shank 13 takes a bearing in a perforation in an upstanding holding member 15 which is fastened to said rigid member 26 by a screw member 17 through an arm 16 of said holding member 15. The outer end of said rigid arm 26 has a boss 25 thereon having a perforation therethrough at right angles to the length of said rigid arm. A second bevel gear 19 meshing with bevel gear 18 has a short shank 23 integral therewith, and takes a bearing in said perforation through the end of said rigid arm and is held in place by a compression ring 24 in a groove surrounding shank 23 of beveled gear 19 as shown at 32. Said short shank 23 and bevel gear 19 have a square shaped perforation therethrough as is shown by the dotted-in portion 33 of the bevel gear in Fig. 4. This is for the purpose of holding nut-holding member 22 at its squared portion 21 as shown at 34, 35, 36, or as shown by the dotted-in portion above said bevel 19 in perforation 20. This materially assists in permitting the nut holding member to be used in different positions for loosening and tightening nuts, and the like. It will be observed the lower bowl of nut-holding member 22 has an opening 34 therein to adaptably fit nut 36 and to loosen or tighten the same on bolt 35.

Figure 3:
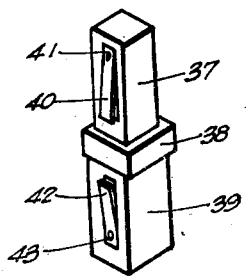
Figure 3 is a perspective view of a key member for adjustably connecting the nut holding member with the shank of the bevel gear member and with the universal joint, and with a standard or other socket.

Figure 3 shows another embodiment which may be used to operatively connect the device to the universal joint and to a socket and standard socket for wrench connection, where a reduction of the size is desirable, in which 37 designates the smaller square end, 39 the square lower portion, and 38 the larger square middle shoulder therebetween. The upper portion 37 has a spring 40 anchored to said portion by pin 41, and the lower portion 39 has a spring 42 anchored to said portion 39 by pin 43; still another embodiment of connecting the nut turning member is shown at 44 having a shoulder 45 and lower body 46; the holding spring 48 acts on a ball 47 pressing it against the inner square perforation 20.

The crank rod 5 may be made any length as desired but the preferred length would be nine or ten inches. The nut holding member may be adapted to fit any size or any shaped nut and may be placed either above or below the bevel gear member 19 and into the end of bevel gear member 18.

It will be apparent when the nut 36 to be tightened or loosened is fitted with nut turning member 22 thereover, handle, crank and crank rod members 1, 2 and 5 may be turned while the round portion 3 of crank member 5 is in the bearing or clasp 31, or that said shank, crank and handle may be raised above the bearing or clasp 31 at any distance desired and at any angle desired and when in such position the same may be turned, thereby turning the universal joint members 7, 8, 9, 10, 11 and 12 acting on shank member 13 through holding member 15 turning bevel gear 18; if nut turning member 22 is placed in the end of bevel gear member 18 the crank works directly through the universal joint member to turn bevel gear member 18 and nut holding member 22; when it is desired to use nut holding member 22 in connection with bevel gear member 19 and its shank 23 through the holding member 25, bevel gear member 18 meshes with bevel gear member 19 and turns nut holding member 22 acting on the nut 36 either tightening or loosening it. It will also be apparent when it is desired to loosen a nut or other holding member which has been fastened exceedingly tight or is rusted so that it is held tightly, crank 5 may be lowered and its squared portion 4 securely placed in slot 28 of permanent holding member 26 and the whole wrench comprised of both the shank, crank and handle and the rigid holding member 26 may be used as one wrench instead of as a revoluble universal joint member of the wrench. When it is desired to use the wrench in connection with the various sized sockets or standard sockets the reducing member shown at Figure 3 may be used.

From the description of the one-sheet accompanying drawing and the specification the advantages of the making, construction, applying and operating of the wrench, as described, will be apparent to those skilled in the art to which my invention pertains; but it will be understood that any modifications within the scope of the claimed invention may be made in the construction, operation and application, without departing from the principle of the invention or sacrificing any of its advantages.

Having thus described the invention, what is claimed and desired to be secured by Letters Patent is:

1. A wrench of the character described in combination with a universal joint, comprising a handle, crank and crank-rod, meshed bevel gears with hollowed shanks, a movable nut-fitting and holding member fitting therein, a long rigid holding member with perforated holding means for said bevel gears near one end thereof, the other end L-shaped; said crank-rod having a squared portion near its crank end; said L-shaped portion having a slot in one side adapted to hold said squared portion of said crank-rod.

2. The combination with a universal joint, of a wrench, as described, comprising a handle, crank, and crank-rod member, meshed bevel gears with hollowed shanks, a nut holding and interchangeably fitting member revolubly fitting in said hollowed shanks, and adapted to turn various nuts and other holding means, a long rigid holding member with perforated holding means for said bevel gears near one end, the other end L-shaped. a holding slot in one edge of said L-shaped portion and a clasp bearing means thereabove, the whole adapted to tighten and loosen nuts and other holding means.

3. The combination with a universal joint, of a wrench of the character described, comprising a handle, crank, and crank-rod, one end of said crank-rod being connected to said universal joint, and having a squared portion near its crank end, said handle, crank, and crank-rod being adapted to rotate said universal joint from various angles, said squared portion adapted to fit a slot in a rigid member hereafter described, its round portion near its crank end taking a bearing in a clamping means in a rigid member; two meshed bevel gears each having hollowed shanks; one of said bevel gears connecting said universal joint; a long rigid holding member having a cross-section perforated holding means in one end, its other end being L-shaped and having in one side of said L-shaped portion a slot adapted to receive and hold the square portion of said crank-rod, and having in the other portion of said L-shaped portion a perforation adapted to receive and hold a clamping member making a bearing for the round portion of said crank-rod; a holding member adapted to tighten and loosen nuts and other holding means and adapted to be fastened in the hollow shanks of said bevel gears.

ALBERT W. SCHOEB.